United States Patent
Castelain et al.

(10) Patent No.: US 9,331,755 B2
(45) Date of Patent: May 3, 2016

(54) METHOD AND A DEVICE FOR TRANSFERRING OFDM SYMBOLS REPRESENTATIVE OF PLURAL STREAMS

(71) Applicant: MITSUBISHI ELECTRIC CORPORATION, Chiyoda-ku (JP)

(72) Inventors: Damien Castelain, Rennes (FR); Cristina Ciochina, Rennes (FR)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/365,521

(22) PCT Filed: Dec. 12, 2012

(86) PCT No.: PCT/EP2012/075220
§ 371 (c)(1),
(2) Date: Jun. 13, 2014

(87) PCT Pub. No.: WO2013/087690
PCT Pub. Date: Jun. 20, 2013

(65) Prior Publication Data
US 2015/0003552 A1  Jan. 1, 2015

(30) Foreign Application Priority Data
Dec. 16, 2011  (EP) ..................... 11193915

(51) Int. Cl.
*H03K 11/00* (2006.01)
*H04L 25/60* (2006.01)
(Continued)

(52) U.S. Cl.
CPC .......... *H04B 7/0421* (2013.01); *H04L 27/2626* (2013.01); *H04B 7/0413* (2013.01); *H04L 27/2647* (2013.01)

(58) Field of Classification Search
CPC .............. H04L 27/2647; H04L 5/0007; H04L 27/2657; H04L 27/2662; H04L 5/0048
USPC .................. 375/211–215, 259–285, 295–315
See application file for complete search history.

(56) References Cited

U.S. PATENT DOCUMENTS 8,477,677 B2 * 7/2013 Naden ........................... 370/315
8,526,454 B2 * 9/2013 Wang et al. .................... 370/419
(Continued)

FOREIGN PATENT DOCUMENTS

WO  2008/093233  8/2008

OTHER PUBLICATIONS

International Search Report issued Mar. 27, 2013, in PCT/EP12/075220, filed Dec. 12, 2012.
(Continued)

*Primary Examiner* — James M Perez
(74) *Attorney, Agent, or Firm* — Oblon, McClelland, Maier & Neustadt, L.L.P.

(57) ABSTRACT

A method and device for transferring OFDM symbols representative of at least a first and a second stream from a source including a first number of antenna to at least one receiver. The source demultiplexes the first stream to extract at least one first pilot sequence and first data and the second stream to extract at least one second pilot sequence and second data, multiplies the at least one first pilot sequence and first data by a first coefficient, the at least one second pilot sequence and second data by a second coefficient different from the first coefficient, sums first multiplied data and second multiplied data, multiplexes the sum, the at least one first and second multiplied pilot sequences to form the OFDM symbols, and transfers the OFDM symbols.

4 Claims, 6 Drawing Sheets

(51) Int. Cl.
*H04L 25/64* (2006.01)
*H04B 7/04* (2006.01)
*H04L 27/26* (2006.01)

(56) References Cited

U.S. PATENT DOCUMENTS

| | | |
|---|---|---|
| 2005/0094603 A1 | 5/2005 | Kim et al. |
| 2005/0190821 A1* | 9/2005 | Fujii et al. .......... H04B 7/15535 375/211 |
| 2006/0285505 A1* | 12/2006 | Cho et al. ...................... 370/254 |
| 2007/0019747 A1 | 1/2007 | Aldana |
| 2009/0168689 A1* | 7/2009 | Itagaki et al. ................ 370/315 |
| 2010/0031110 A1 | 2/2010 | Seok et al. |
| 2010/0238882 A1 | 9/2010 | Zhang et al. |
| 2010/0246717 A1 | 9/2010 | Aldana |
| 2011/0103269 A1* | 5/2011 | Zheng .......................... 370/279 |
| 2011/0110284 A1* | 5/2011 | Wu et al. ............ H04B 7/15521 370/312 |

OTHER PUBLICATIONS

Written Opinion of the International Searching Authority issued Mar. 27, 2013, in PCT/EP12/075220, filed Dec. 12, 2012.

* cited by examiner

METHOD AND A DEVICE FOR TRANSFERRING OFDM SYMBOLS REPRESENTATIVE OF PLURAL STREAMS

The present invention relates generally to a method and a device for transferring Orthogonal Frequency Division Multiplex symbols representative of at least a first and a second streams.

For broadcasting signals representative of plural streams, terrestrial sources or terrestrial and satellite sources may be used in order to increase the area in which broadcasted signals are received.

Generally, some of terrestrial sources transfer different streams using MIMO (Multiple Input Multiple Output) technique. The receivers have plural antennas and receive these streams.

In order to be able to demodulate data of the streams, receivers need to receive at least two streams with a good enough signal to noise ratio.

If a receiver receives only one of the streams with a good signal to noise ratio, it can not demodulate the data of the streams.

Satellite is used for increasing the coverage area of the terrestrial network, when the signal to noise ratio from terrestrial sources is not good enough.

The issue is that generally, only one transmit antenna is available on the satellite, so the satellite can not perform MIMO technique. In situation when the signals transferred by terrestrial sources are not received at all or almost not received, the receiver will not be able to decode the streams from the signal received from the satellite if the satellite transfers only one of the streams.

Some terrestrial sources may have, for example for cost reasons, a reduced number of antennas, for example a single antenna. If only one transmit antenna is available on these terrestrial sources, these terrestrial sources can not perform MIMO technique. In situation when the signals transferred by terrestrial sources performing MIMO technique are not received at all or almost not received, the receiver will not be able to decode the streams from the signal received from the terrestrial sources having a reduced number of antennas, i.e. if the terrestrial sources having a reduced number of antennas do not transfer all these streams.

The present invention aims at providing a method and a device which enable a receiver to receive streams even if the signals transferred by terrestrial sources performing MIMO technique have no good signal to noise ratio.

To that end, the present invention concerns a method for transferring Orthogonal Frequency Division Multiplex symbols representative of at least a first and a second streams from a source comprising a first number of antenna to at least one receiver, characterised in that the method comprises the steps, executed by the source, of:

demultiplexing the first stream in order to extract at least one first pilot sequence and first data,
demultiplexing the second stream in order to extract at least one second pilot sequence and second data,
multiplying the at least one first pilot sequence and first data by a first coefficient,
multiplying the at least one second pilot sequence and second data by a second coefficient different from the first coefficient,
summing first multiplied data and second multiplied data,
multiplexing the sum of first multiplied data and second multiplied data, the at least one first multiplied pilot sequence and the at least one second multiplied pilot sequence in order to form the Orthogonal Frequency Division Multiplex symbols representative of at least a first and a second streams,
transferring the Orthogonal Frequency Division Multiplex symbols representative of at least a first and a second streams.

The present invention also concerns a device for transferring Orthogonal Frequency Division Multiplex symbols representative of at least a first and a second streams from a source comprising a first number of antenna to at least one receiver, characterised in that the device is included in the source and comprises:

means for demultiplexing the first stream in order to extract at least one first pilot sequence and first data,
means for demultiplexing the second stream in order to extract at least one second pilot sequence and second data,
means for multiplying the at least one first pilot sequence and first data by a first coefficient,
means for multiplying the at least one second pilot sequence and second data by a second coefficient different from the first coefficient,
means for summing first multiplied data and second multiplied data,
means for multiplexing the sum of first multiplied data and second multiplied data, the at least one first multiplied pilot sequence and the at least one second multiplied pilot sequence in order to form the Orthogonal Frequency Division Multiplex symbols representative of at least a first and a second streams,
means for transferring the Orthogonal Frequency Division Multiplex symbols representative of at least a first and a second streams.

Thus, the receiver can receive streams even if the signals transferred by a source comprising a second number of antennas have no good signal to noise ratio and even if the source comprising the first number of antenna has no MIMO ability.

According to a particular feature, the source comprising the first number of antenna is included in a satellite and the first and second streams are transferred by at least one terrestrial source on the same channel resources as the source comprising the first number of antenna, the terrestrial source comprising a second number of antennas upper than the first number of antenna.

Thus, the coverage area is increased thanks to the source included in the satellite even if it has no MIMO scheme ability.

The present invention also concerns a method for receiving Orthogonal Frequency Division Multiplex symbols representative of at least a first and a second streams from at least two sources by a receiver, one source comprising a first number of antenna, one source comprising a second number of antennas upper than the first number of antenna, the receiver comprising plural antennas, characterised in that the method comprises the steps, executed by the receiver, of:

detecting if signals transferred by the source comprising the first number of antenna are preponderant over signals received by the receiver from the source comprising the second number of antennas,
optimising the channel estimation and/or the decoding of the streams if signals transferred by the source comprising the first number of antenna are preponderant over signals received by the receiver from the source comprising the second number of antennas.

The present invention also concerns a device for receiving Orthogonal Frequency Division Multiplex symbols representative of at least a first and a second streams from at least two sources by a receiver, one source comprising a first number of antenna, one source comprising a second number of antennas upper than the first number of antenna, the receiver comprising plural antennas, characterised in that the device is included in the receiver and comprises:

means for detecting if signals transferred by the source comprising the first number of antenna are preponderant over signals received by the receiver from the source comprising the second number of antennas, means for optimising the channel estimation and/or the decoding of the streams if signals transferred by the source comprising the first number of antenna are preponderant over signals received by the receiver from the source comprising the second number of antennas.

Thus, the receiver can receive streams even if the signals transferred by the source comprising the second number of antennas have no good signal to noise ratio and even if the source comprising the first number of antenna has no MIMO ability.

According to a particular feature, the source comprising the first number of antenna is included in a satellite, the first and second streams are transferred by at least one terrestrial source on the same channel resources as the source comprising the first number of antenna, the terrestrial source comprising a second number of antennas upper than the first number of antenna.

Thus, the coverage area is increased thanks to the source included in the satellite even if it has no MIMO scheme ability.

According to a particular feature, detecting if signals transferred by the source comprising the first number of antenna are preponderant over signals received by the receiver from the source comprising the second number of antennas is performed using localisation information.

Thus, channel estimation and/or MIMO decoding can be improved.

According to a particular feature, detecting if signals transferred by the source comprising the first number of antenna are preponderant over signals received by the receiver from the source comprising the second number of antennas is performed using header of the stream broadcasted by the source included in the satellite or in the header broadcasted by the terrestrial source.

Thus, channel estimation and/or MIMO decoding can be improved.

According to a particular feature, detecting if signals transferred by the source comprising the first number of antenna are preponderant over signals received by the receiver from the source comprising the second number of antennas is performed by estimating the channel corresponding to at least one pilot sequence of the first stream and the channel corresponding to at least one pilot sequence of the second stream and by analysing the correlation between channel estimates.

Thus, channel estimation and/or MIMO decoding can be improved.

According to a particular feature, detecting if signals transferred by the source comprising the first number of antenna are preponderant over signals received by the receiver from the source comprising the second number of antennas is performed by estimating the frequency selectivity of channel corresponding to at least one pilot sequence of the first stream and/or the channel corresponding to at least one pilot sequence of the second stream.

Thus, channel estimation and/or MIMO decoding can be improved.

According to a particular feature, estimating the frequency selectivity is performed by determining the maximum and minimum amplitude values of the channels.

Thus, channel estimation and/or MIMO decoding can be improved.

According to a particular feature, optimising the channel estimation is performed by reducing the cut-off frequency of smoothing filters that reduce the noise on the channel estimates.

Thus, the noise affecting the channel estimates is reduced. The receiver performances are then improved.

According to a particular feature, optimising the decoding of the stream is performed by executing a 16 Quadrature Amplitude Modulation decoding.

Thus, an optimal MIMO decoding is implemented with low complexity. The receiver performances are improved and/or the complexity of the receiver is decreased and its electric power consumption is reduced.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatuses according to the invention, they will not be repeated here.

The characteristics of the invention will emerge more clearly from a reading of the following description of an example of embodiment, the said description being produced with reference to the accompanying drawings, among which:

Figure 4:
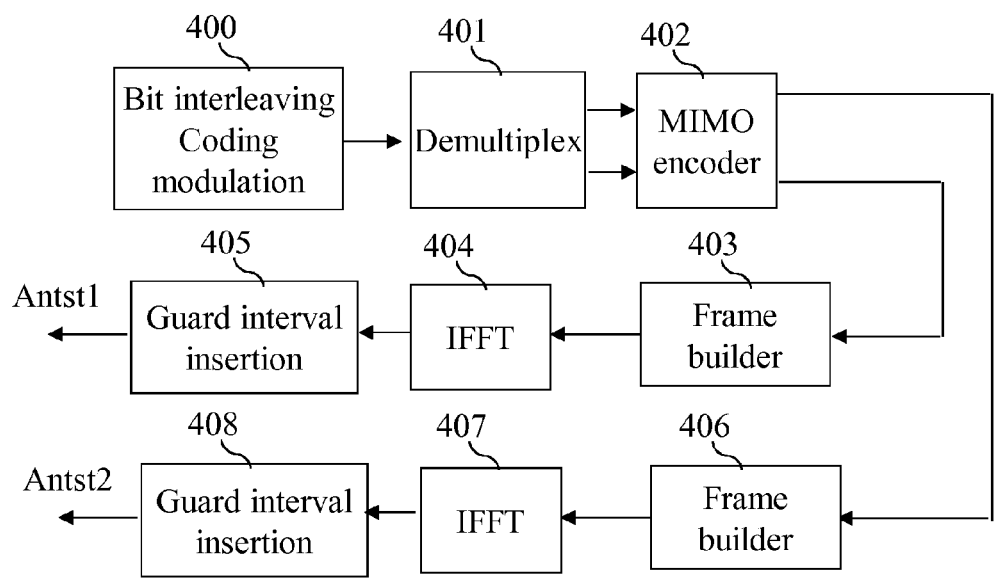
Figure 5:
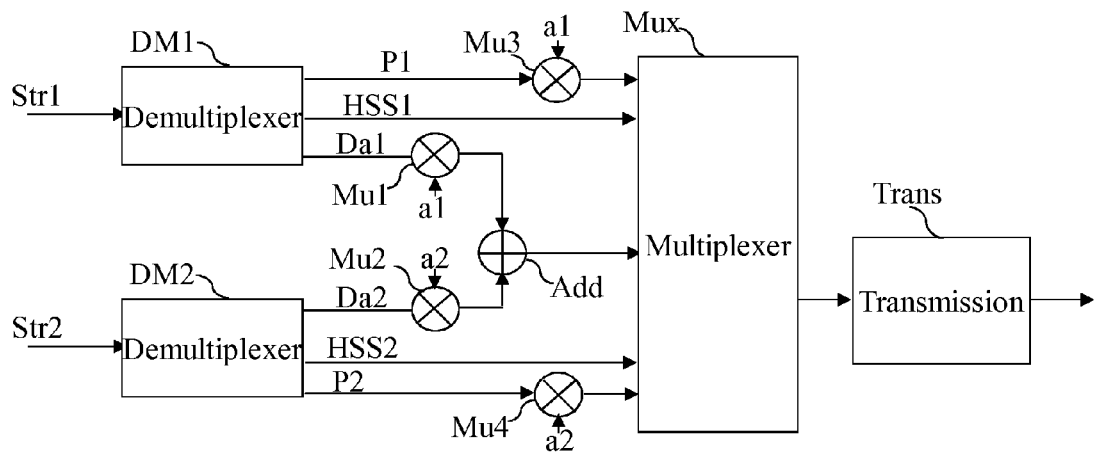
Figure 6:
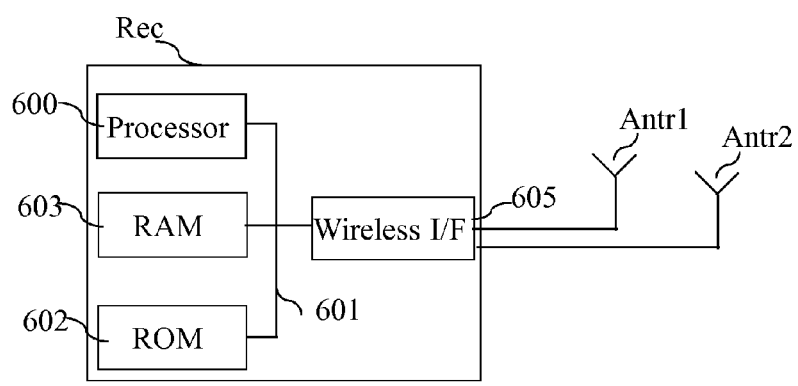
Figure 7:
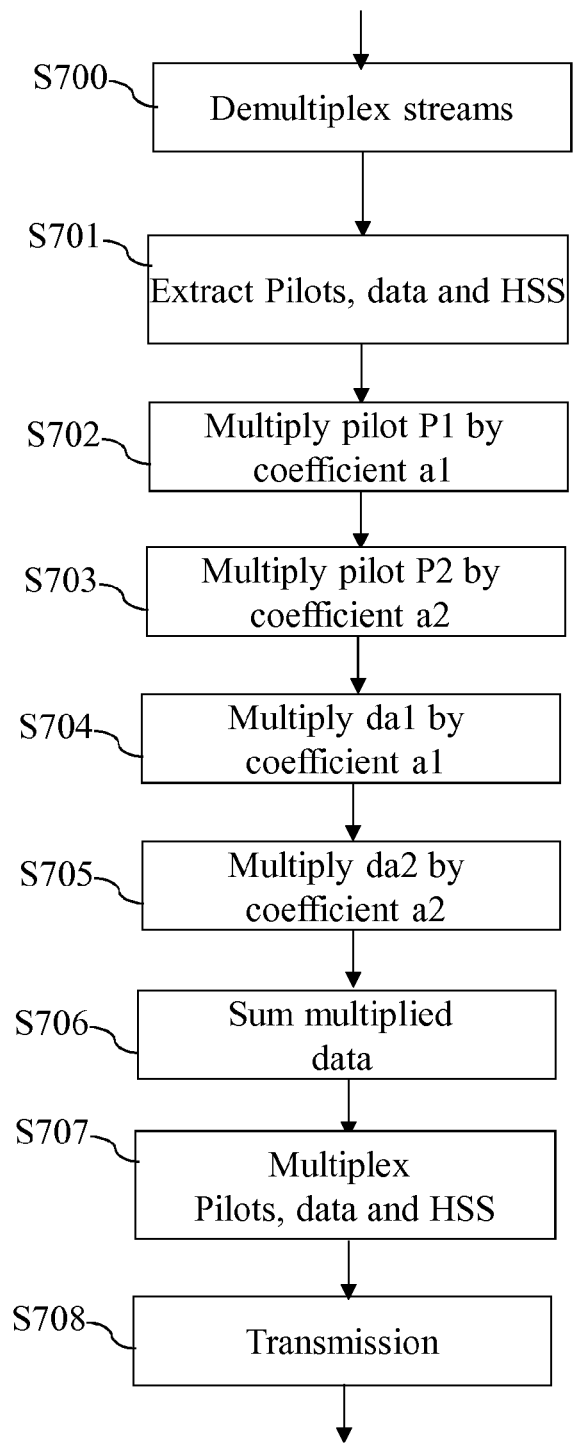
Figure 8:
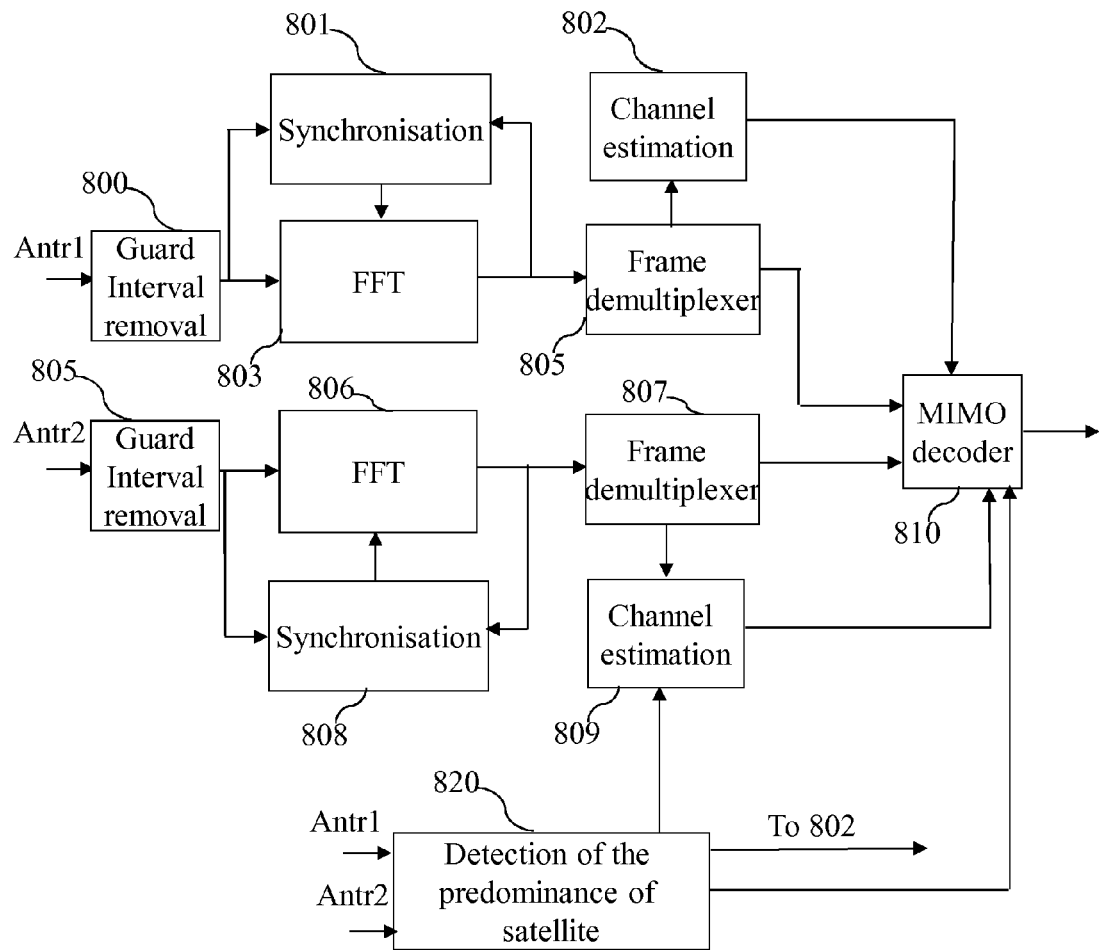
Figure 9:
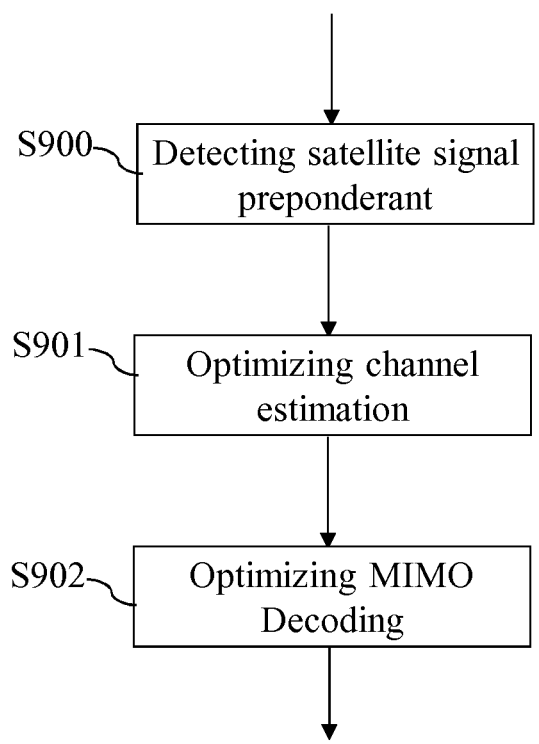

FIG. 4 discloses a block diagram of components of a wireless interface of the source comprising the second number of antennas;

FIG. 5 discloses a block diagram of components of a wireless interface of the source comprising the first number of antenna according to the present invention;

FIG. 6 is a diagram representing the architecture of a receiver in which the present invention is implemented;

FIG. 7 discloses an example of an algorithm executed by the source comprising a first number of antenna according to the present invention;

FIG. 8 discloses a block diagram of components of a wireless interface of the receiver according to the present invention;

FIG. 9 discloses an example of an algorithm executed by a receiver according to the present invention.

Figure 1:
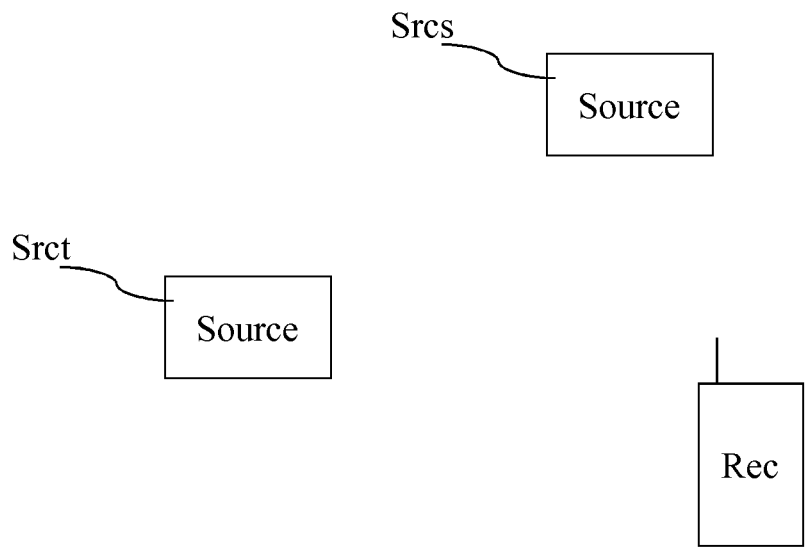
FIG. 1 represents a telecommunication network in which the present invention is implemented.

FIG. 1 represents a telecommunication network in which the present invention is implemented.

The telecommunication network is for example a telecommunication network in which different sources Srct, and Srcs broadcast signals within an area in which at least one receiver Rec is located.

The source Srct is for example a terrestrial station. The source Srct broadcasts signals representative of a first stream and broadcasts signals representative of a second stream which is different from the first stream.

The source Srcs has a limited number of antennas and is for example a terrestrial station or is included in a satellite. The source Srcs has less antennas than the source Srct.

According to the invention, the source Srcs broadcasts signals representative of the first and second streams.

The streams may comprise audio and/or video programs.

The source Srct comprises plural antennas and implements a multi-stream MIMO scheme.

The receiver Rec, equipped with at least two antennas, can demodulate the two streams, even when not receiving the signal broadcasted by the source Srcs, as long as the signals broadcasted by the source Srct are received with a signal to noise ratio good enough. The source Srcs is used for increasing the coverage area when the signals broadcasted by the source Srct are received with a signal to noise ratio not good enough.

It has to be noted here that the present invention is described in an example wherein the source Srct has two antennas, the receiver Rec has two antennas and the source Srcs has one antenna.

The present invention is also applicable when the source Srct has more antennas and transfers more than two streams using MIMO scheme. In that case, the source Srcs has less antennas than the source Srct and transfers less OFDM multiplex streams using MIMO scheme than the source Srct. However, these multiplex streams are representative, according to the invention, of all the streams sent by the source Srct. The receiver Rec has at least the same number of antennas as the source Srct.

Only one source Srcs is shown in the FIG. 1 for the sake of simplicity, but the network may comprise a more important number of sources Srcs.

Only one source Srct is shown in the FIG. 1 for the sake of simplicity, but the network may comprise a more important number of sources Srct.

Only one receiver Rec is shown in the FIG. 1 for the sake of simplicity, but signals may be broadcasted to a more important number of receivers Rec.

The receiver Rec may be a mobile terminal to which data like video signals are broadcasted or a mobile terminal which is in communication with a remote telecommunication device like a mobile phone or with a server or a base station or a home base station which receives signals from a mobile terminal.

The source Srct transfers the streams Str1 and Str2 under the form of OFDM symbols that may be compatible with DVB-NGH broadcasting norm (Digital Video Broadcasting—Next Generation Handheld) under discussion.

The signals broadcasted by the source Srcs are OFDM symbols, for example compatible with DVB-NGH broadcasting norm.

According to the invention, the source Srcs:
demultiplexes the first stream in order to extract at least one first pilot sequence and first data,
demultiplexes the second stream in order to extract at least one second pilot sequence and second data,
multiplies the at least one first pilot sequence and first data by a first coefficient,
multiplies the at least one second pilot sequence and second data by a second coefficient different from the first coefficient,
sums first multiplied data and second multiplied data,
multiplexes the sum of first multiplied data and second multiplied data, the at least one first multiplied pilot sequence and the at least one second multiplied pilot sequence in order to form the Orthogonal Frequency Division Multiplex symbols representative of at least a first and a second streams,
transfers the Orthogonal Frequency Division Multiplex symbols representative of at least a first and a second streams.

The receiver Rec:
detects if signals transferred by the source comprising the first number of antenna are preponderant over signals received by the receiver from the source comprising the second number of antennas,
optimises the channel estimation and/or the decoding of the streams if signals transferred by the source comprising the first number of antenna are preponderant over signals received by the receiver from the source comprising the second number of antennas.

Figure 2:
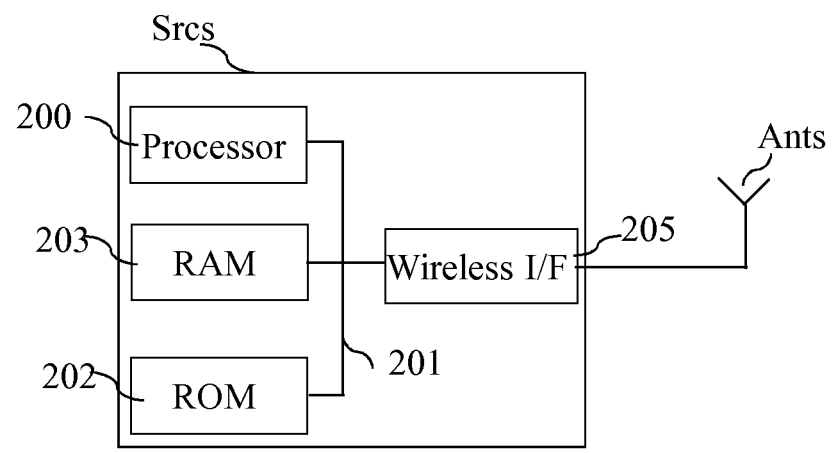
FIG. 2 is a diagram representing the architecture of a source comprising a first number of antenna in which the present invention is implemented.

FIG. 2 is a diagram representing the architecture of a source comprising a first number of antenna in which the present invention is implemented.

The source Srcs has, for example, an architecture based on components connected together by a bus 201 and a processor 200 controlled by the program as disclosed in FIG. 7.

It has to be noted here that the source Srcs may have an architecture based on dedicated integrated circuits.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 7.

The processor 200 controls the operation of the wireless interface 205.

The read only memory 202 contains instructions of the program related to the algorithm as disclosed in FIG. 7, which are transferred, when the source Srcs is activated, to the random access memory 203.

The wireless interface 205 comprises means for transferring multiplexed streams according to the invention to receiver Rec.

The wireless interface 205 is connected to an antenna Ants used for broadcasting signals according to the present invention.

The wireless interface 205 comprises components as disclosed in FIG. 5.

Figure 3:
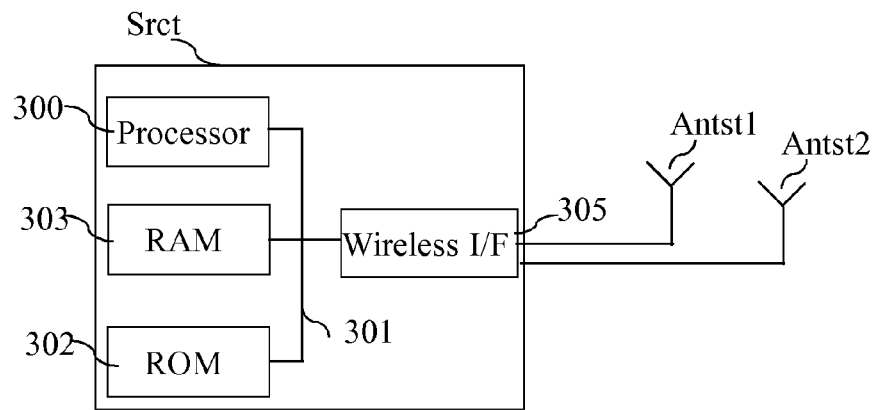
FIG. 3 is a diagram representing the architecture of a source comprising a second number of antennas in which the present invention is implemented.

FIG. 3 is a diagram representing the architecture of a source comprising a second number of antennas in which the present invention is implemented.

The source Srct has, for example, an architecture based on components connected together by a bus 301 and a processor 300.

It has to be noted here that the source Srct may have an architecture based on dedicated integrated circuits.

The bus 301 links the processor 300 to a read only memory ROM 302, a random access memory RAM 303 and a wireless interface 305.

The memory 303 contains registers intended to receive variables and the instructions of programs.

The processor 300 controls the operation of the wireless interface 305.

The wireless interface 205 comprises means for transferring plural streams Str1 and Str2 using MIMO scheme to receiver Rec.

The wireless interface 205 is connected to antennas Antst1 and Antst2 used respectively for broadcasting signals representative of streams Str1 and Str2.

The wireless interface 205 comprises components as disclosed in FIG. 4.

FIG. 4 discloses a block diagram of components of a wireless interface of the source comprising the second number of antennas.

The wireless interface 305 is disclosed in an example wherein two multiplexed streams are transferred. One skill man of the art would easily transpose the wireless interface architecture disclosed in FIG. 3 in cases where more than two multiplex streams need to be transferred.

The wireless interface 305 comprises a bit interleaving, coding and modulation module 400.

The wireless interface 305 comprises a demultiplexer 401 connected to the output of the bit interleaving, coding and modulation module 400.

The demultiplexer 401 divides data into plural streams.

In the example of FIG. 4, the demultiplexer 401 divides data into two streams.

The wireless interface 305 comprises a MIMO encoder 402 which encodes both streams according to MIMO scheme.

A first encoded stream is provided by the MIMO encoder 402 to a frame builder 403 which build frames comprising data, pilot sequences, header and signalling information.

The wireless interface 305 comprises an IFFT module 404 which performs an Inverse Fast Fourier Transform of the frame provided by the frame builder 403.

The wireless interface 305 comprises a guard interval insertion module 405 which inserts guard intervals like cyclic prefix between OFDM symbols provided by the IFFT module 404. The output of the guard interval insertion module 405 is connected to the antenna Antst1 of the source Srct.

For simplicity of the description and without any loss in generality, the wording 'antenna' includes the usual functions of filtering, digital to analogue conversion, radio frequency transposition, amplification.

A second encoded stream is provided by the MIMO encoder 402 to a frame builder 406 which build frames comprising data, pilot sequences, header and signalling information.

The wireless interface 305 comprises an IFFT module 407 which performs an Inverse Fast Fourier Transform of the frame provided by the frame builder 406.

The wireless interface 305 comprises a guard interval insertion module 408 which inserts guard intervals like cyclic prefix between OFDM symbols provided by the IFFT module 407. The output of the guard interval insertion module 408 is connected to the antenna Antst2 of the source Srct.

FIG. 5 discloses a block diagram of components of a wireless interface of the source according to the present invention.

The wireless interface 205 is disclosed in an example wherein two multiplexed streams are transferred. One skill man of the art would easily transpose the wireless interface architecture disclosed in FIG. 5 in cases where more than two multiplex streams need to be transferred.

The wireless interface 205 comprises a demultiplexer DM1 which demultiplexes a stream Str1 which is broadcasted by the source Srct1.

The stream Str1 is composed of at least one pilot sequence P1, of data Da1 and of a header, signalling and synchronisation symbols HSS1.

The wireless interface 205 comprises a multiplier Mu3 which multiplies the at least one pilot sequence P1 by a coefficient a1.

For example, the coefficient a1 is equal to 1. It has to be noted that the coefficient a1 may take a complex value too.

The wireless interface 205 comprises a multiplier Mu1 which multiplies the data Da1 by the coefficient a1.

The wireless interface 205 comprises a demultiplexer DM2 which demultiplexes a stream Str2 which is broadcasted by the source Srct2.

The stream Str2 is composed of at least one pilot sequence P2, of data Da2 and of a header, signalling and synchronisation symbols HSS2 that may be identical to header, signalling and synchronisation symbols HSS1.

The wireless interface 205 comprises a multiplier Mu4 which multiplies the at least one pilot sequence P2 by a coefficient a2.

For example, the coefficient a2 is equal to 2. It has to be noted that the coefficient a2 may take a complex value too.

The wireless interface 205 comprises a multiplier Mu2 which multiplies the data Da2 by the coefficient a2.

The wireless interface 205 comprises a adder Add which sums the multiplied data Da1 and Da2 in order to form a data stream a1Da1+a2Da2.

The multiplied pilot sequences P1 and P2, the sum a1Da1+a2Da2 and the headers, signalling and synchronisation symbols HSS1 HSS2 are fed into a multiplexer Mux in order to form a stream to be broadcasted by the source Srcs.

The multiplexer Mux maps the at least one multiplied pilot sequence P1 on time/frequency resources and maps the at least one multiplied pilot sequence P2 on time/frequency resources which may be different from the one on which the at least one pilot sequence P1 is mapped.

The stream to be broadcasted by the source Srcs is transferred to a transmission module Trans which processes it in order to broadcast it under the form of OFDM radio signals.

FIG. 6 is a diagram representing the architecture of a receiver in which the present invention is implemented.

The receiver Rec has, for example, an architecture based on components connected together by a bus 601 and a processor 600 controlled by the program as disclosed in FIG. 9.

It has to be noted here that the receiver Rec may have an architecture based on dedicated integrated circuits.

The bus 601 links the processor 600 to a read only memory ROM 602, a random access memory RAM 603 and a wireless interface 605.

The memory 603 contains registers intended to receive variables and the instructions of the program related to the algorithm as disclosed in FIG. 9.

The processor 600 controls the operation of the wireless interface 605.

The read only memory 602 contains instructions of the program related to the algorithm as disclosed in FIG. 9, which are transferred, when the receiver Rec is activated, to the random access memory 603.

The wireless interface 605 comprises means for receiving radio signals broadcasted by the sources Srct and/or Srcs.

The wireless interface 605 is connected to at least two antennas Antr1 and Antr2 used for receiving broadcasted signals.

FIG. 7 discloses an example of an algorithm executed by a source comprising the first number of antenna according to the present invention.

More precisely, the present algorithm is executed by the processor 200 of the source Srcs.

At step S700, the processor 200 demultiplexes the streams Str1 and Str2 which are broadcasted by the source Srct. The streams Str1 and Str2 are received by the source Srcs on a classical dedicated transmission channel.

The stream Str1 is composed of at least one pilot sequence P1 and of data Da1, and may comprise also header, signalling and synchronisation symbols HSS1.

The stream Str2 is composed of at least one pilot sequence P2 and of data Da2, and may comprise also header, signalling and synchronisation symbols HSS2.

The signalling and synchronisation symbols HSS1 and HSS2 are preferably identical.

At next step S701, the processor 200 extracts the pilot sequences P1 and P2, data Da1, Da2 and the headers, signalling and synchronisation symbols HSS1 and HSS2

At next step S702, the processor 200 multiplies the at least one pilot sequence P1 by a coefficient a1.

For example, the coefficient a1 is equal to 1. It has to be noted that the coefficient a1 may take also a complex value.

At next step S703, the processor 200 multiplies the at least one pilot sequence P2 by a coefficient a2.

For example, the coefficient a2 is equal to 2. It has to be noted that the coefficient a2 may take also a complex value.

It has to be noted here that the coefficients a1 and/or a2 may be transferred to the receiver Rec in the signalling.

At next step S704, the processor 200 multiplies the data Da1 by the coefficient a1.

At next step S705, the processor 200 multiplies the data Da2 by the coefficient a2.

At next step S706, the processor 200 sums the multiplied data Da1 and Da2 in order to form a data stream a1Da1+a2Da2.

At next step S707, the processor 200 forms a stream to be broadcasted by the source Srcs. The multiplied pilot sequences a1P1 and a2P2, the sum a1Da1+a2Da2 and the headers, signalling and synchronisation symbols HSS1 HSS2 are mapped on time/frequency resources.

The at least one multiplied pilot sequence a1P1 is mapped on time/frequency resources and the at least one multiplied pilot sequence a2P2 is mapped on time/frequency resources which may be different from the one on which the at least one multiplied pilot sequence a1P1 is mapped.

The stream to be broadcasted by the source Srcs is transferred to a transmission module which processes it in order to broadcast it under the form of radio signals at step S708.

FIG. 8 discloses a block diagram of components of a wireless interface of the receiver according to the present invention.

The wireless interface 605 is disclosed in an example wherein two multiplexed streams are transferred. One skill man of the art would easily transpose the wireless interface architecture disclosed in FIG. 8 in cases where more than two multiplex streams need to be transferred.

The wireless interface 605 comprises a guard interval removal module 800 which removes the guard interval from signals received from Antr1.

The wireless interface 605 comprises a FFT (Fast Fourier Transform) module 803 which is linked to the output of the guard interval removal module 800.

The wireless interface 605 comprises a synchronisation module 801 which is connected to the output of the guard interval removal module 800 and to the output of FFT module 803.

The synchronisation module 801 provides synchronisation to the FFT module 803.

The output of the FFT module 803 is connected to a frame demultiplexer module 805 and to the synchronisation module 801.

The channel estimation module 802 estimates, according to the invention, the channel from information provided by a module 820 of detection of the predominance of signals received from the source Srcs using pilot symbols provided by the frame demultiplexer module 805. The channel estimation is provided to the MIMO decoder module 810.

The frame demultiplexer module 805 extracts at least one pilot sequence a1P1 and at least one pilot sequence a2P2 and provides them to the channel estimation module 802.

The frame demultiplexer module 805 extracts data and provides them to the MIMO decoder module 810.

The wireless interface 605 comprises a guard interval removal module 805 which removes the guard interval from signal received from Antr2.

The wireless interface 805 comprises a FFT module 806 which is linked to the output of the guard interval removal module 805.

The wireless interface 605 comprises a synchronisation module 808 which is connected to the output of the guard interval removal module 805 and to the output of the FFT module 806.

The synchronisation module 808 provides synchronisation to the FFT module 806.

The output of the FFT module 806 is connected to a frame demultiplexer module 807 and to the synchronisation module 808.

The channel estimation module 809 estimates, according to the invention, the channel from information provided by a module 820 of detection of the predominance of signals received from the source Srcs using pilot symbols provided by the frame demultiplexer module 807. The channel estimation is provided to the MIMO decoder module 810.

The frame demultiplexer module 807 extracts at least one pilot sequence a1P1 and at least one pilot sequence a2P2 and provides them to the channel estimation module 809.

The frame demultiplexer module 807 extracts data and provides them to the MIMO decoder module 810.

The FIG. 8 displays an example of a MIMO receiver, with two receiver antennas Antr1 and Antr2.

The receiver Rec may have a more important number of receive antennas Antr.

Each signal received on a antenna is first treated as a SISO (Single Input Single Output) signal. It has to be noted here that the synchronisation and channel estimation functions for the different receive antennas may be combined for further optimisation. Then, a MIMO decoder is performed. It may consist of a optimal ML (Maximum Likelihood) decoder, a sphere decoder, equivalent to ML or slightly sub-optimal or a sub-optimal MMSE (Minimum Mean Square Error) decoder. The output of the MIMO decoder is then multiplexed in an inverse way as the demulptiplexer 401 of FIG. 4. Then the signal is deinterleaved and channel decoded.

The module 820 of detection of the predominance of signals received from the source Srcs detects if signals received from the source Srcs are predominant by several possible ways.

The module 820 detects if signals received from the source Srcs are predominant using localisation information (e.g. GPS) and service information sent by sources Srct and Srcs.

The module 820 detects, using signals received from each antenna Antr1 and Antr2 or for signals received from one antenna Antr1 or Antr2, if signals received from the source Srcs are predominant using in the header or in the signalling broadcasted by the source Srcs, a specific signal sequence. For example, a specific sequence is sent by the source Srcs and another one is sent by the source Srct. The receiver Rec evaluates received corresponding symbols for example by executing a correlation with the specific emitted sequences.

The module 820 detects, using signals received from each antenna Antr1 and Antr2 or for signals received from one antenna Antr1 or Antr2, if signals received from the source Srcs are predominant by estimating the channel h1 corresponding to the at least one pilot sequence P1 and the channel h2 corresponding to the at least one pilot sequence P2. When the source Srcs is preponderant, h1 and h2 are highly correlated, h1 and h2 are equal when only the signals broadcasted by the source Srcs are received.

It has to be noted here that the channel h1 corresponding to the at least one pilot sequence P1 is the equivalent channel between antenna Antr1 and the antenna Ants of source Srcs, and the antennas Antr1 and Antr2. The channel h2 corresponding to the at least one pilot sequence P2 is the equivalent channel between antenna Antr2 and the antenna Ants of source Srcs, and the antennas Antr1 and Antr2. By analysing the correlation between h1 and h2, and comparing to a threshold, the receiver Rec can decide about the preponderance of the source Srcs signal.

The module 820 detects, using signals received from each antenna Antr1 and Antr2 or for signals received from one antenna Antr1 or Antr2, if signals received from the source Srcs are predominant by estimating the frequency selectivity of h1 and h2. If the signals transferred by the source Srct are received, generally, h1 and/or h2 will vary in frequency, which is not the case if the signals transferred by the source Srcs are highly preponderant.

For example, to analyse the selectivity of h1 or h2 signals, the maximum and minimum amplitude values are taken and the difference is compared to a threshold. This difference can be divided by the mean amplitude value prior to the comparison to the threshold. Instead of using the difference, the ratio can also be used.

For example, the standard deviation of the square of amplitude of h1 or h2 is calculated. The square norm is determined and normalised prior to comparison to a threshold.

For example, the normalisation or in other words the analysis of the selectivity, is performed by calculating the kurtosis of h1 or h2.

In probability theory and statistics, kurtosis (from the Greek word κυρτός, kyrtos or kurtos, meaning bulging) is any measure of the "peakedness" of the probability distribution of a real-valued random variable. In a similar way to the concept of skewness, kurtosis is a descriptor of the shape of a probability distribution and, just as for skewness, there are different ways of quantifying it for a theoretical distribution and corresponding ways of estimating it from a sample from a population.

One common measure of kurtosis is based on a scaled version of the fourth moment of the data or population, but it has been argued that this measure really measures heavy tails, and not peakedness.

The Kurtosis of a signal is:

$$\gamma_2 = \frac{\kappa_4}{\kappa_2^2} = \frac{\mu_4}{\sigma^4} - 3,$$

where $\kappa_4$ is the fourth cumulant, $\kappa_2$ is the second cumulant, $\mu_4$ is the fourth moment, $\sigma$ is the standard deviation.

The module 820 of detection of the predominance of signals received from the source Srcs transfers information to the channel estimation modules 802, 809 and to the MIMO decoder 810.

If signals broadcasted by the source Srcs are preponderant, the channel estimation scheme can be optimised.

For example, thanks to a lower frequency selectivity, the smoothing filter that reduces the noise on the channel estimates can use a shorter cut-off frequency and hence reduces the estimation noise more efficiently.

For example, thanks to the high correlation between channels $h_1$ and $h_2$, the smoothing filters of $h_1$ and $h_2$ can use this correlation to improve its efficiency. The smoothed estimates on $h_1$ (resp. $h_2$) i.e. $\hat{h}_1$ (resp $\hat{h}_2$) will use both rough estimates on $h_1$ and $h_2$, i.e. $\tilde{h}_1$ and $\tilde{h}_2$. It has to be noted here that if the signals broadcasted by the source Srcs are highly preponderant, the smoothed estimates of $h_1$ and $h_2$ will be set equal.

The module 820 of detection of the predominance of signals received from the source Srcs transfers information to the MIMO decoder 810.

The MIMO decoding module 810, when the estimates on $h_1$ and $h_2$ are equal, can be made very simple, while being optimal. For example, if a1 and a2 coefficients are equal to 1 and 2 and if a QPSK (Quadrature Phase Shift Keying) modulation is used by the source Srct for each antenna Antst1 and Antst2, then a 16QAM (Quadrature Amplitude Modulation) is used by the source Srcs and the MIMO decoding is a classical 16QAM demapper.

FIG. 9 discloses an example of an algorithm executed by a receiver according to the present invention.

More precisely, the present algorithm is executed by the processor 600 of the receiver Rec.

At step S900, the processor 900 detects if signals received from the source Srcs are predominant over signals received from the source comprising the second number of antennas Srct by several possible ways.

The processor 600 detects if signals received from the source Srcs are predominant using localisation information and service information sent by sources Srct1, Srct2 and Srcs.

The processor 600 detects, using signals received from each antenna Antr1 and Antr2 or for signals received from one antenna Antr1 or Antr2, if signals received from the source Srcs are predominant using in the header or in the signalling broadcasted by the source Srcs, a specific signal sequence. For example, a specific sequence is sent by the source Srcs and another one is sent by the source Srct. The processor 600 evaluates received corresponding symbols for example by executing a correlation.

The processor 600 detects, using signals received from each antenna Antr1 and Antr2 or for signals received from one antenna Antr1 or Antr2, if signals received from the source Srcs are predominant by estimating the channel h1 corresponding to the at least one pilot sequence P1 and the channel h2 corresponding to the at least one pilot sequence P2. When the source Srcs is preponderant, h1 and h2 are highly correlated (h1 and h2 are equal when only the signals broadcasted by the source Srcs are received. By analysing the correlation between h1 and h2, and comparing to a threshold, the processor 600 can decide about the preponderance of the source Srcs signal.

It has to be noted here that the channel h1 corresponding to the at least one pilot sequence P1 is the equivalent channel between antenna Antr1 and the antenna Ants of source Srcs, and the antennas Antr1 and Antr2. The channel h2 corresponding to the at least one pilot sequence P2 is the equivalent channel between antenna Antr2 and the antenna Ants of source Srcs, and the antennas Antr1 and Antr2.

The processor 600 detects, using signals received from each antenna Antr1 and Antr2 or for signals received from one antenna Antr1 or Antr2, if signals received from the source Srcs are predominant by estimating the frequency selectivity of h1 and h2. If signals transferred by source Srct are received, generally, h1 and/or h2 will vary in frequency, which is not the case if the signals transferred by source Srcs are highly preponderant.

For example, to analyse the selectivity of h1 or h2 signals, the maximum and minimum amplitude values are taken and the difference is compared to a threshold. This difference can be divided by the mean amplitude value of the amplitude prior to the comparison to the threshold. Instead of using the difference, the ratio can also be used.

For example, the standard deviation of the square of amplitude of h1 or h2 is calculated. The square norm is determined and normalised prior to comparison to a threshold.

For example, the normalisation, or in other words the analysis of the selectivity, is performed by calculating the kurtosis of h1 or h2 as already disclosed.

At next step S901, the processor 600 performs a channel estimation.

If signals broadcasted by the source Srcs are preponderant, the channel estimation scheme can be optimised.

For example, thanks to a lower frequency selectivity, the smoothing filter that reduces the noise on the channel estimates can use a shorter cut-off frequency and hence reduces the estimation noise more efficiently.

For example, thanks to the high correlation between channels $h_1$ and $h_2$, the smoothing filters of $h_1$ and $h_2$ can use this correlation to improve its efficiency. The smoothed estimates on $h_1$ (resp. $h_2$) i.e. $\hat{h}_1$ (resp $\hat{h}_2$) will use both rough estimates on $h_1$ and $h_2$, i.e. $\tilde{h}_1$ and $\tilde{h}_2$. It has to be noted here that if the signals broadcasted by the source Srcs are highly preponderant, the smoothed estimates of $h_1$ and $h_2$ will be set equal.

At next step S902, the processor 600 performs the MIMO decoding.

The MIMO decoding, when the estimates on $h_1$ and $h_2$ are equal, can be made very simple, while being optimal. For example, if a1 and a2 coefficients are equal to 1 and 2 and if a QPSK modulation is used by the source Srct for each antenna Antst1 and Antst2, then a 16QAM is used by the source Srcs and the MIMO decoding is a classical 16QAM demapper.

It has to be noted here that steps S901 and S902 are disclosed when executed both. The present invention is also applicable when only steps S900 and S901 or only steps S900 and S902 are executed.

Naturally, many modifications can be made to the embodiments of the invention described above without departing from the scope of the present invention.

The invention claimed is:

1. A method for transmitting Orthogonal Frequency Division Multiplex symbols representative of at least a first and a second stream from a source including a first number of antennas to at least one receiver, the method comprising, executed by the source:
   demultiplexing the first stream to extract at least one first pilot sequence and first data;
   demultiplexing the second stream to extract at least one second pilot sequence and second data;
   multiplying the at least one first pilot sequence and first data by a first coefficient;
   multiplying the at least one second pilot sequence and second data by a second coefficient different from the first coefficient;
   summing first multiplied data and second multiplied data;
   multiplexing the sum of first multiplied data and second multiplied data, the at least one first multiplied pilot sequence and the at least one second multiplied pilot sequence to form the Orthogonal Frequency Division Multiplex symbols representative of at least the first and the second streams; and
   transmitting the Orthogonal Frequency Division Multiplex symbols representative of at least the first and the second streams from the source including the first number of antennas to the at least one receiver.

2. A method according to claim 1, wherein the source comprising the first number of antenna is included in a satellite and the first and second streams are transferred by at least one terrestrial source on the same channel resources as the source comprising the first number of antenna, the terrestrial source comprising a second number of antennas upper than the first number of antenna.

3. A device for transmitting Orthogonal Frequency Division Multiplex symbols representative of at least a first and a second stream from a source comprising a first number of antennas to at least one receiver, the device is included in the source and comprises:
   means for demultiplexing the first stream in order to extract at least one first pilot sequence and first data;
   means for demultiplexing the second stream in order to extract at least one second pilot sequence and second data;
   means for multiplying the at least one first pilot sequence and first data by a first coefficient;
   means for multiplying the at least one second pilot sequence and second data by a second coefficient different from the first coefficient;
   means for summing first multiplied data and second multiplied data;
   means for multiplexing the sum of first multiplied data and second multiplied data, the at least one first multiplied pilot sequence and the at least one second multiplied pilot sequence to form the Orthogonal Frequency Division Multiplex symbols representative of at least the first and the second streams; and
   means for transmitting the Orthogonal Frequency Division Multiplex symbols representative of at least the first and the second streams from the source including the first number of antennas to the at least one receiver.

4. A non-transitory computer readable medium including a computer program that may be directly loadable into a programmable device, comprising instructions or portions of code for implementing the method according to claim 1 when executed on the programmable device.

* * * * *